United States Patent [19]

Weikert

[11] 4,436,567
[45] Mar. 13, 1984

[54] METHOD FOR JOINING WEBS OF ASEPTIC POUCHES

[76] Inventor: Roy J. Weikert, c/o 645 S. High St., Covington, Ohio 45318

[21] Appl. No.: 360,299

[22] Filed: Mar. 22, 1982

[51] Int. Cl.³ ............................................. B65H 69/02
[52] U.S. Cl. ...................................... 156/158; 156/159
[58] Field of Search ............... 156/157, 158, 159, 502, 156/503, 506, 509, 344, 308.2, 308.4, 309.6, 252, 253; 53/167, 426

[56] References Cited

U.S. PATENT DOCUMENTS

| 2,974,717 | 3/1961 | Lindsay | 156/253 |
| 4,021,283 | 5/1977 | Weikert | 156/244.14 |
| 4,171,604 | 10/1979 | Weikert | 53/167 |
| 4,265,279 | 5/1981 | Weikert | 53/426 |
| 4,369,779 | 1/1983 | Spencer | 156/159 |

Primary Examiner—Michael W. Ball
Attorney, Agent, or Firm—Biebel, French & Nauman

[57] ABSTRACT

A method and apparatus for joining webs of aseptic pouches such that the internal asepsis of the pouches is preserved includes bringing the ends of the webs to be joined into overlapping relationship to form an overlapping area, applying a double-sided microbicidal adhesive tape between the overlapping ends so that the ends are held in overlapping relationship, applying heat to the overlapping area sufficient to form a peel seal between the opposing walls of the webs in the overlapping area, making a transverse fusion-like incision within the peel seal in the overlapping area, applying a microbicidal adhesive tape to outside surfaces of the webs in the overlapping area to microbicidally seal the fusion-like incision, and separating the walls of the webs thereby forming a continuous and sterile passageway between the pouches through the incision. The apparatus includes a bag supporting assembly including a splicing frame having flanges with clamps for supporting the bags in a fixed overlapping relationship across the flanges, a peel seal tool for making a peel seal between the walls of the bags, and a cutter device for making a fusion-like incision in the bags. The assembly also includes a tool support which may provide a work surface or slidably receive the peel seal tool or cutter devices so that the peel sealing and cutting portions are maintained at elevations coplanar with the bags supported on the splicing frame.

8 Claims, 19 Drawing Figures

METHOD FOR JOINING WEBS OF ASEPTIC POUCHES

BACKGROUND OF THE INVENTION

1. Field of the Invention

The present invention relates to methods and apparatus for joining webs of pouches such that the asepsis of the interior of the webs is maintained, and, in particular, methods and apparatus for joining webs of pouches made from a tube-shaped web of a heat-sealable polyolefin to maintain asepsis of the interior of the pouches.

2. Prior Art

Plastic bags or pouches having sterilized interiors are commonly used to store material, such as food products, for long periods of time. Since the pouches are impervious to microorganisms, the asepsis of the contents can be maintained indefinitely.

One type of plastic pouch is made of a heat-sealable polyolefin such as polyethylene or polypropylene. These pouches are manufactured through a process which includes making an aseptic web of pouches by first blow-extruding a continuous closed tube using a non-contaminating gas, then dividing the tube by means of partial, transverse heat seals into a series of interconnected pouches which intercommunicate with each other in a closed system by means of a continuous channel which runs across their open mouths. Such a method is discussed more fully in applicant's U.S. Pat. No. 4,021,283 issued May 3, 1977.

Such a web of pouches is filled by piercing the wall of an end pouch in the area adjacent the continuous channel and inserting a pipe along the channel. The pipe typically has an orifice which can be positioned to discharge material into the mouths of the individual pouches. In order to maintain the asepsis of the web of pouches, the filling pipe is preferably covered by a sterilizing boot made of a plastic material which is attached to the leading end of the sealed web of pouches. The leading end of the filling pipe is conical in shape to facilitate puncturing the wall of the boot and the wall of the web of bags so that the sterilizing pipe can be inserted into the continuous channel.

As set forth in applicant's U.S. Pat. No. 4,171,604, issued Oct. 23, 1979 the web of pouches is joined to the boot by first placing a patch saturated with an appropriate sterilizing agent on the web of internally sterile pouches and securing it thereto by means of double-sided tape. The portion of the web carrying the patch is placed over the boot so that the double-sided tape causes the two tubular members to be held together. The pointed end of the filling tube may then pierce the wall of the boot, pass through the sterilizing patch, and pierce the adjacent wall of the web of pouches to enter the common channel, without exposing the interiors of the boot and channel to contaminated ambient air.

Webs of pouches typically are packed and shipped in containers, usually made of fibreboard, and are fan-folded in the containers. Depending on the size of the pouch, the pouches may be folded two or more abreast. For many high volume operations, it is often necessary to fill a number of pouches larger than the number of pouches normally joined in a single web and packed in a single container. One method is to fill the pouches of a single web from a single container, then remove that web of pouches completely and begin the process again for a second web of pouches in a second container. However, this method has a disadvantage in that a substantial amount of time is required to resterilize the filling pipe and re-insert the filling pipe into a continuous channel in a succeeding web of bags.

Accordingly, there is a need for a method and apparatus for joining internally aseptic webs of bags or pouches together to form a continuous web of pouches without destroying the internal sterility of the pouches and to minimize, if not eliminate, production downtime caused by the prior art methods of joining webs.

SUMMARY OF THE INVENTION

The present invention provides a method and apparatus for joining webs of internally sterile pouches such that the asepsis of the interiors of the webs joined is maintained. Therefore, utilizing the method and apparatus of the invention, an indefinite number of webs of pouches can be joined to form a single continuous web of pouches, without contaminating the interiors of the pouches. The invention also provides a method and apparatus for joining aseptic pouches which involves a minimum number of steps and can be accomplished in a short period of time. The apparatus required is relatively inexpensive to fabricate and does not require exotic and/or expensive materials.

The present invention provides a method of joining webs of aseptic pouches of the type having a body made of a tube-shaped web of a heat-sealable polyolefin which is collapsed to form opposing walls, each pouch having a compartment with sides defined by transverse seals extending from one edge of the web partially across the body, thereby forming a channel along an opposite edge. The method begins with the step of bringing a leading sterile pouch from one of the webs into overlapping relationship with a trailing sterile pouch from the other one of the webs of pouches, thereby forming an overlapping area extending transversely of the web and consisting of four layers of web. Alternately, the leading pouch of a web is positioned to overlap the closed end of the sterilizing boot.

A strip of double-sided, microbicidal adhesive is placed between the overlapping ends to hold the adjacent layers of the two ends in overlapping relationship and to provide a sterilized interface between the overlapping ends. Next, heat is applied to the overlapping area sufficient in pressure, dwell, and temperature to form a "peel seal" between opposing walls of each tube of the webs in the overlapping area. This effectively blocks the overlapping area from the remainder of the respective webs of pouches.

A transverse fusion-like incision is then made adjacent the downstream web end seal and longitudinal with the peel seal in such a manner as to leave a peel seal margin completely around the incision. By fusion-like incision it is meant an incision made such that the edges of the webs are blocked at the point of the incision. The incision extends completely through the four layers of web and the microbicidal tape. Although the incision is exposed to ambient air, the remainders of the webs, as well as the overlapping areas, are sealed from ambient air by the peel seals.

The incision is sealed by applying single-sided, microbicidal tape to the opposite outer surfaces of the overlapping area above and below the incision to seal the incision from ambient air, and restore the original continuity of the outer wall surfaces at the point of incision. The joining process is now complete. The peel sealed walls can now be separated, preferably by planar displacement of the walls of the webs relative to each other in the overlapping area. Ultimately, the overlapping spliced area reaches the tapered, lead end of the filler pipe, which further separates the peel seal of the first web of pouches, to the previously separated incision, passing therethrough into the second web of pouches, further separating the peel seal thereof and forward into the continuous channel of the second web of pouches, thereby separating the walls of the second web beginning with the at least partly separated incision and extending upstream along the web of pouches. Thus, a continuous, aseptic and hermetically sealed passageway is formed between the two webs of pouches.

The apparatus of the invention comprises a web supporting assembly which preferably includes a splicing frame having a trough portion and substantially planar flanges extending outwardly from the upper part of the trough portion. The flanges each support a clamp means. The assembly also includes a channel-shaped tool support which slidably engages the trough portion. The tool support can be oriented within the splicing frame such that a flat side of a cross member of the support is substantially co-planar with the splicing frame flanges to provide a substantially continuous flat surface to support the overlapping webs. The ends of the webs are placed on the flat side of the support in overlapping relation and the clamps are rotated to press the webs against the flanges of the frame to hold them in place.

The peel seal step of the process is performed by a peel seal tool consisting of a pair of electrically heated pads, each mounted on separate opposing jaws which are joined together by a pivot. The jaws are joined to a pair of handles which can be squeezed together to cause the heating pads to compress against each other in a locked position, thereby supplying the requisite pressure to form the peel seal. The heat clamp also includes a transformer for providing the appropriate voltage and current to the heating pads.

The incision is preferably made by a cutter having a blade and an anvil, each mounted on jaws which are joined by a pivot. The jaws are attached to handles which can be squeezed together to force the blade to contact the anvil in a locked position with sufficient force to make an incision through the overlapping layers of web. The cutter preferably includes a lever, positioned between the handles, to facilitate the separation of the blade from the anvil to an unlocked position.

The tool support may be inverted in the trough portion to expose a side opposite the flat side which supports the peel seal tool and cutter. This side is defined by a pair of opposing walls, each including a rail extending therefrom toward the other opposing wall, the rails being in the same plane. The peel seal tool and the cutter each preferably includes a portion which defines opposing grooves which are shaped and sized to engage slidably the rails of the inverted tool support. When the tool support is so inverted and is inserted into the trough portion of the frame, the cutter or peel seal tool may be slidably positioned within the tool support such that the anvil or lower heating pad, respectively, is at an elevation which is co-planar with the upper portion of the flanges to provide a substantially level working surface.

Accordingly, it is an object of the present invention to provide a method and apparatus of joining internally aseptic pouches to maintain the asepsis of the interior of the pouches; a method which is relatively simple to perform and consists of few steps; and apparatus which is relatively inexpensive to construct and can be made from relatively inexpensive materials.

Other objects and advantages of the invention will be apparent from the following description, the accompanying drawings, and the appended claims.

DETAILED DESCRIPTION OF THE PREFERRED EMBODIMENT

Web Supporting Assembly

Figures 1, 2, 3, 4:
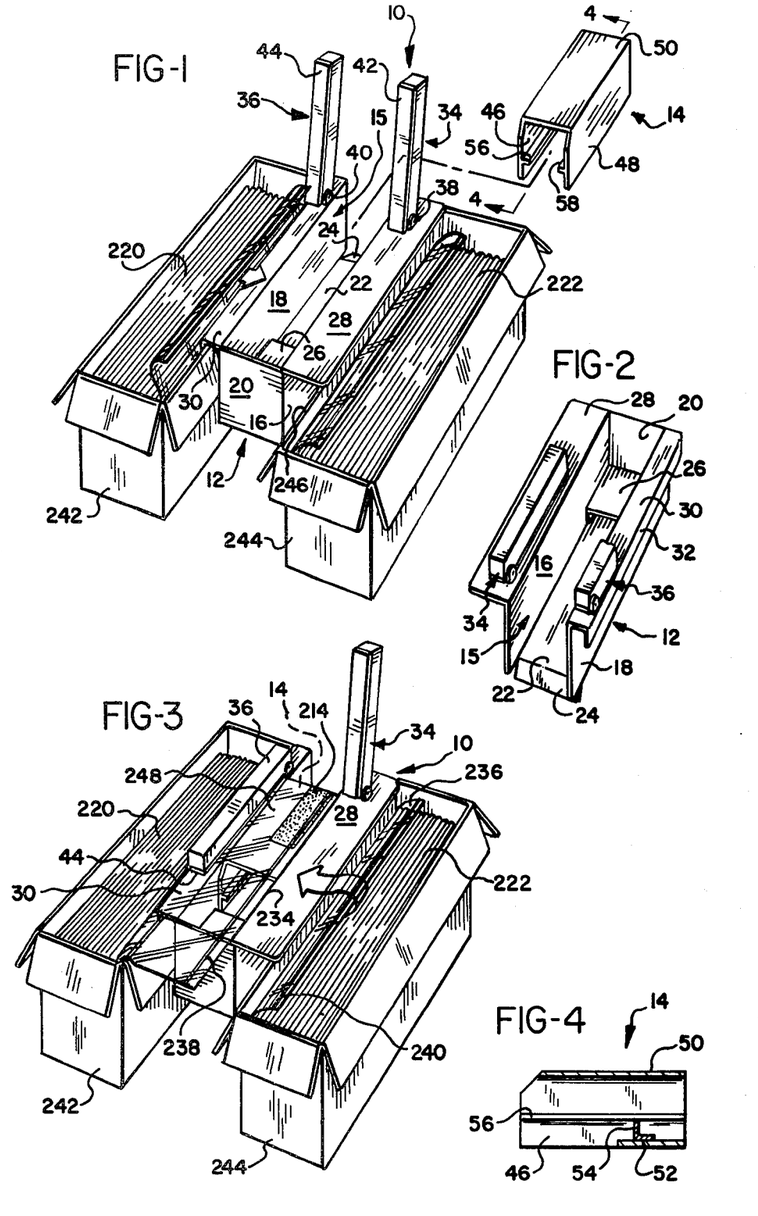
FIG. 1 is a perspective view of the bag supporting assembly of the preferred embodiment of the invention in which the splicing frame is positioned between two cartons of fan-folded webs of pouches and in which the tool support is shown separated from the splicing frame.
FIG. 2 is a perspective view of the splicing frame of FIG. 1 in which one of the clamp jaws has been broken away to show the flange.
FIG. 3 is a perspective view of the web supporting assembly of FIG. 1 in which the tool support has been inserted into the splicing frame and a clamp is holding down a leading end of a web of pouches.
FIG. 4 is a side elevation, in section of the tool support taken on line 4—4 of FIG. 1.

As shown in FIGS. 1 and 2, the web supporting assembly of the preferred embodiment, generally designated 10, comprises a splicing frame 12, and a channel-shaped tool support 14. The splicing frame 12 includes a trough portion 15 defined by side walls 16, 18 joined by a rear wall 20. The side walls 16, 18 and rear wall 20 extend upwardly from a base 22 which extends from the rear wall forwardly to terminate in a downturned lip 24. The base 22 supports a stop 26 which abuts the rear wall 20 and spans the base to abut the side walls 16, 18.

The side walls 16, 18 of the splicing frame 12 include an upper portion having flanges 28, 30, respectively, which are co-planar with one another to provide a level working surface. Flange 30 includes a downturned edge 32 extending along its length. The flanges 28, 30 mount clamping jaws 34, 36, respectively, which are attached to their respective flanges by pivots 38, 40. Clamping jaws 34, 36 include inserts 42, 44 made of a frictional material such as rubber. The clamping jaws 34, 36 are attached to their respective flanges 28, 30 adjacent the open end of the splicing frame 12 so that they may be rotated toward the flanges such that the inserts 42, 44 face the plane of the flanges.

Figures 5, 6, 7:
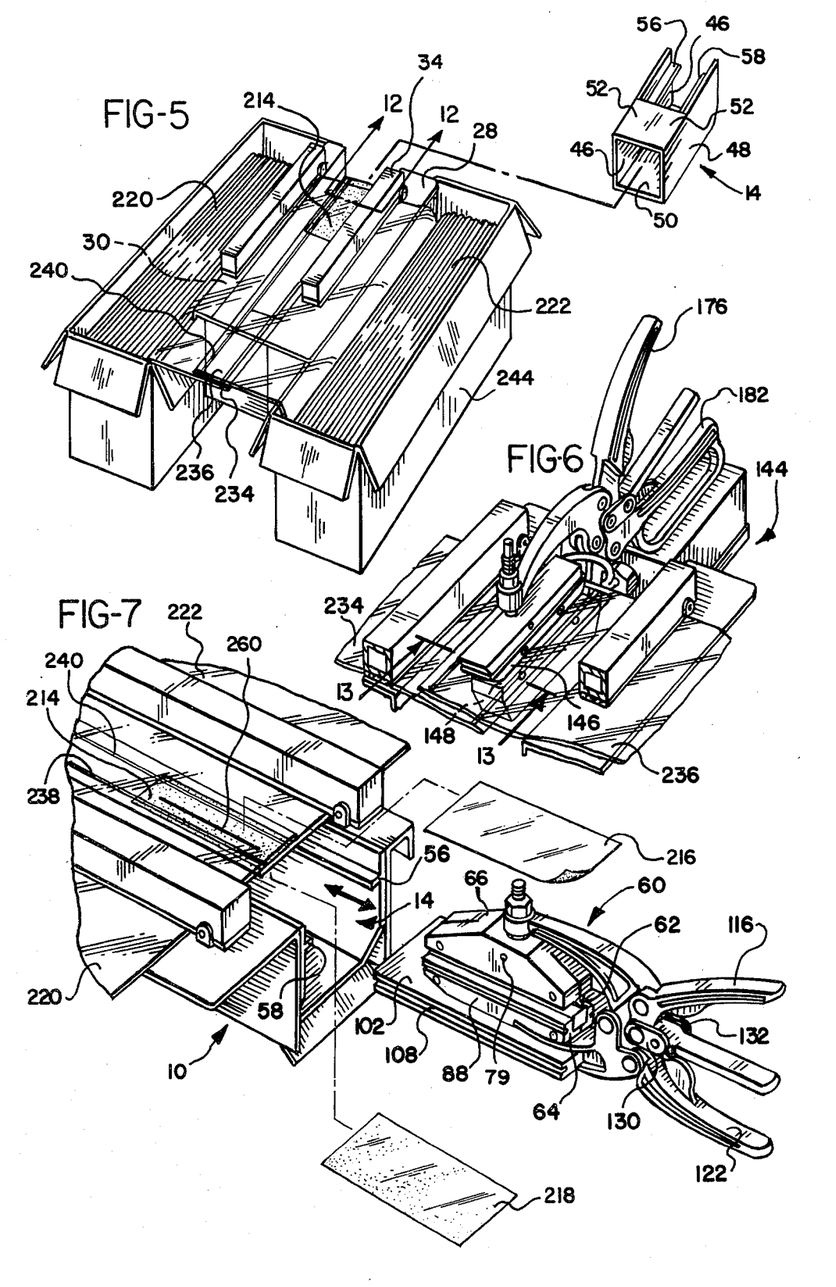
FIG. 5 is a perspective view of the web supporting assembly of FIG. 1 in which the clamping jaws each hold an end of a web of pouches which are supported on the assembly to form an overlapping area.
FIG. 6 is a perspective view of a detail of the web supporting assembly of FIG. 5 in which a peel seal tool is positioned within the splicing frame.
FIG. 7 is a perspective view of a detail of FIG. 5 showing the insertion of a cutter into the splicing frame and the application of single-sided microbicidal tape.

As shown in FIGS. 1, 4, and 5, the tool support 14 includes side walls 46, 48 which extend upwardly from a base 50 (as shown in FIG. 5). Base 50 extends along the lengths of the side walls 46, 48 and provides a flat working surface. The walls 46, 48 extend perpendicularly to the base 50 and are joined by a cross member 52 which extends only part way from the rear portion of the support 14 toward the front portion. The cross member 52 mounts a length of angle which serves as a stop 54. The side walls 46, 48 of the tool support 14 include rails 56, 58 which extend inwardly from an inner face of the side walls and oppose each other within the tool support.

The tool support 14 has a width, measured from side wall 46 to side wall 48, such that it may be inserted between the side walls 16, 18 of the splicing frame 12. The tool support 14 has a height, measured from the base 50 to the cross member 52, such that when inserted into the splicing frame as shown in FIG. 3, the base provides a substantially continuous, level working surface with the flanges 28, 30 of the splicing frame 12. In the preferred embodiment, the base 50 is approximately 0.125 inches below the flanges 28, 30 so that tape may slide beneath overlapping webs lying on the flanges without catching on the webs when positioning the tape below the joint.

Peel Seal Tool

Figures 9, 10, 11:
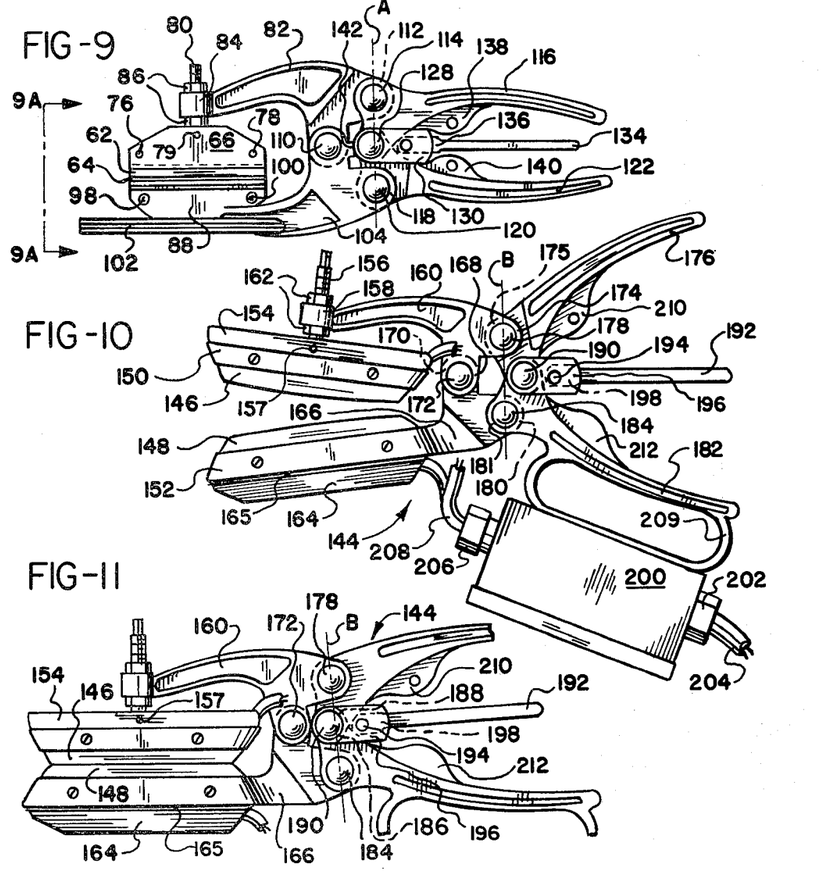
FIG. 9 is a side view of the cutter of FIG. 8 adjusted to a closed position.
FIG. 10 is a side view of the peel seal tool shown in FIG. 6 and adjusted to an open position.
FIG. 11 is a partial side view of the peel seal tool of FIG. 10 adjusted to a closed position.

As shown in FIGS. 6, 10, and 11, the peel seal tool, generally designated 144, includes upper and lower heating pads 146, 148. Although the heating pads 146, 148 may be fabricated from any resistance heating-type material, in the preferred embodiment the pads consist of a silicone belt having an embedded resistance wire in a zig-zag pattern, then covered with a polytetrafluoroethylene-impregnated fibreglass covering. The polytetrafluoroethylene-impregnated covering provides a surface for contacting plastic webs which will not permit the webs to adhere to the heating pads 146, 148 during the heat sealing process. The heating pads 146, 148 are supported in upper and lower assemblies 150, 152. The upper assembly 150 includes a base 154 made of a nonconductive material such as a phenolic, which is rotatably mounted to a bolt 156 by pivot 157. Bolt 156 is received within a boss 158 which forms an integral part of an upper jaw 160 of the peel seal tool 144. Bolt 156 is retained within the boss 158 by lock nuts 162.

The lower assembly 152 includes a lower jaw 164 made of an insulating material such as a phenolic, which forms a housing for the electrical components of the lower heating pad 148. The lower jaw 164 includes a pair of opposing grooves 165 sized to engage the rails 56, 58 of the tool support 14 (FIG. 1). The lower assembly 152 forms an integral part of a lower jaw 166. Upper and lower jaws 160, 166 include lobes 168, 170, respectively, which are joined by a riveted pivot 172. Upper and lower jaws 160, 166 rotate about the pivot 172 such that the heating pads 146, 148 can be brought into engagement with each other or moved away from each other.

The upper jaw includes a lobe 174 which is joined to a lobe 175 of an upper handle 176 by a riveted pivot 178. Similarly, the lower jaw 166 includes a lobe 180 which is joined to a lobe 181 of a lower jaw 182 by a riveted pivot 184. The upper and lower handles 176, 182 include lobes 186, 188 (FIG. 11) which are joined together by a pivot 190. A lever 192 is rotatably attached by a pin 194 to link plates 196 (one of which is not shown). The lever 192 includes a thickened portion 198 adjacent the link plates 196.

The lower handle 182 includes a transformer box 200 which houses a transformer (not shown) which may be of any well-known type for supplying power to the heating pads 146, 148. The transformer box 200 includes a power inlet 202 which communicates with a cord 204 connected to a remote power source (not shown), and an outlet 206 for retaining wires 208 connected to the heating pads 146, 148 in a well-known manner. With the type of heating pads described herein, a preferred form of transformer is a step-down transformer for converting standard alternating current from 110 volts to 12 volts and 3 amps. The transformer box 200 is mounted on a loop 209 which forms an integral part of the lower handle 182.

Figures 8, 9A:
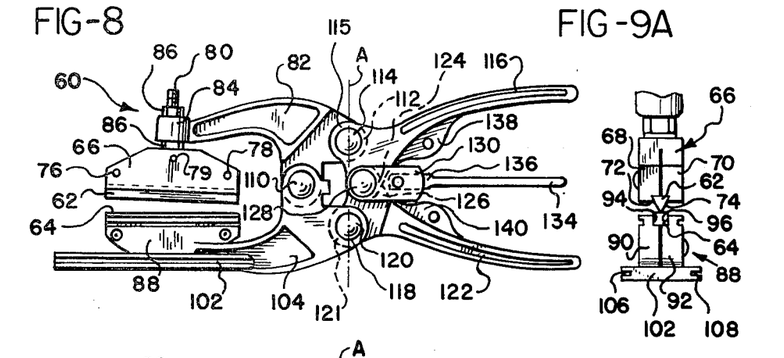
FIG. 8 is a side view of the cutter shown in FIG. 7 adjusted to an open position.
FIG. 9A is a front view of the cutter taken from line 9a—9a in FIG. 9.

As shown in FIG. 11, the clamping action of the upper and lower jaws 160, 166 and upper and lower handles 176, 182 is of the overcenter type similar to that for the cutter 60 shown in FIGS. 8 and 9. When the handles 176, 182 are clamped together, they cause the upper and lower jaws 160, 166 to rotate about the pivot 172, thereby clamping the heating pads 146, 148 together. At the same time, the pivot 190, which is located between pivots 178 and 184 is displaced toward the pivot 172. Once pivot 190 passes the line B joining the pivots 178, 184, it is forced toward the pivot 172, thus maintaining the peel seal tool 144 in a locked position.

To release the peel seal tool 144 from its closed position, the lever 192 is rotated about pin 194 either upwardly or downwardly toward the upper or lower handles 176, 182 so that the thickened portion 198 engages one of the camming surfaces 210, 212. The camming surfaces 210, 212 act as a fulcrum for the lever 192 which urges the pivot 190 away from pivot 172, drawing it past the center line B between pivots 178, 184, urging the peel seal tool 144 into an open position.

When the upper and lower heating pads 146, 148 are clamped together in the manner previously described, the upper pad may rotate about pivot 157 so that the pads contact each other evenly and with uniform pressure along their lengths. The peel seal tool 144 is also adjustable in that the bolt 156 and lock nuts 162 may be repositioned relative to each other to vary the pressure exerted by the pads 146, 148 when the peel seal tool is locked into a clamped position.

Cutter

As shown in FIGS. 7, 8, 9 and 9A, the cutter, generally designated 60, includes a blade 62 made from a length of hardened metal stock having a triangular cross section, and an anvil 64 made of a relatively non-hardened metal such as brass. The blade 62 is mounted in a blade bar 66 which is split into two opposing legs 68, 70 which define notches 72, 74 extending along their lengths for gripping the blade 62. Screws 76, 78 are inserted through leg 68 and are threaded into the opposing leg 70 so that the legs may be clamped together or loosened to grip or release a blade. The triangular shape in cross section of the blade 62 provides three cutting edges so that a single blade may be rotated within the blade bar 66 to provide a longer useful life for a given blade.

The blade bar 66 is rotatably mounted at a pivot 79 to a threaded screw 80 which extends upwardly from the blade bar 66 and is mounted to an upper jaw 82 of the cutter 60. The upper jaw 82 includes a boss 84 at an outer end which receives the screw 80. The screw 80 is retained within the boss 84 by lock nuts 86.

The anvil 64 is mounted within an anvil bar 88 which is similar to the blade bar 66 in that it is split into opposing legs 90, 92. The anvil 64 is generally rectangular in cross section and fits within cut-outs 94, 96 formed in the opposing legs. The opposing legs are joined by screws 98, 100 which are threaded between the opposing legs 90, 92 so that they may be turned to loosen or clamp the opposing legs to the anvil 64.

The anvil bar 88 includes a flange 102 which forms an integral part of a lower jaw 104. The flange 102 is generally plate-shaped and defines opposing longitudinal grooves 106, 108, which extend along its length. As shown in FIG. 7, the flange 102 has a width, measured between its grooves 106, 108, such that it may be positioned within the tool support 14 so that groove 108 engages rail 58 and groove 106 engages rail 56. Thus, the cutter 60 may be slidably mounted within the tool support 14 by engagement of the flange 102 with the rails 56, 58.

The upper and lower jaws 82, 104 are joined at a riveted pivot 110 to rotate with respect to each other. The upper jaw 82 includes a lobe 112 which is connected by a riveted pivot 114 to a lobe 115 of an upper handle 116. The lower jaw 104 includes a lobe 118 which is joined by a riveted pivot 120 to a lobe 121 of a lower handle 122.

The upper and lower handles 116, 122 include lobes 124, 126, respectively, which are rotatably joined by a riveted pivot 128. The riveted pivot 128 also rotatably connects a pair of link plates 130, 132, on either side of the upper and lower handles 116, 122 (also shown in FIG. 7). The link plates 130, 132 rotatably mount a lever 134 which is positioned between the upper and lower handles 116, 122, and includes a thickened portion 136 at a forward end adjacent the link plates. The upper and lower handles 116, 122 include camming surfaces 138, 140, respectively, which extend inwardly from the handles and are positioned adjacent the thickened portion 136 of the lever 134.

As shown in FIG. 8, when the cutter 60 is in the open position, the blade 62 is spaced apart from the anvil 64. The upper and lower handles 116, 122 have been rotated outwardly away from each other about pivot 128. Handles 116, 122 also rotate with respect to adjacent jaws 82, 104 about pivots 114, 120, respectively. The pivot 128 is positioned away from pivot 110 when the cutter is in the open position. If the upper and lower handles 116, 122 are forced apart further than shown in FIG. 8, the rotation of the handles about pivots 114, 120, would cause the lobes 112, 118 of the upper and lower jaws 82, 104 to be drawn to each other, thereby causing the blade 62 to rotate further from the anvil 64.

As shown in FIG. 9, when the upper and lower handles 116, 122 are squeezed together by the hand of an operator, the handles rotate about pivot 128 and the pivots 114, 120 joining them to the upper and lower jaws 82, 104. This causes the pivot 128 to be drawn toward the pivot 110 until it contacts a lug 142 formed in the lower jaw 104. The rotation of the upper and lower handles 116, 122 toward each other causes the upper and lower jaws 82, 104 to rotate toward each other as the lobes 112, 118 are rotated away from each other.

Since the distance from the pivot 114 to the pivot 120 is greatest when the pivot 128 is collinear with them so that they lie on line A, it is at that position that the maximum compressive force is exerted between the anvil 64 and blade 62. It is also at this position that the inherent resiliency of the upper and lower jaws 82, 104 and blade and anvil bars 66, 68 urge the upper and lower jaws apart with the greatest force in response to the force exerted by the handles. As the handles 116, 122 are urged together causing the pivot 128 to pass from a position collinear with pivots 114 and 120 toward pivot 110, the reactionary resilient forces in the jaws 82, 104 and bars 66, 88 force the jaws apart, thereby forcing the lobes 112, 118 toward each other to force further rotation of the handles 116, 122 toward each other, causing the pivot 128 to be forced against the lug 142. The cutter 60 is maintained in a clamped position once the handles 116, 122 have been compressed such that the pivot 128 passes the center line A between pivots 114, 120. Thus, the cutter 60 has an overcenter clamping mechanism in that the jaws 82, 104 remain clamped once the pivot 128 is displaced past the line intersecting pivots 114, 118 toward pivot 110.

To release the cutter 60 from this clamped position, the lever 134 is compressed against either the upper or lower camming surfaces 138, 140 to pry the upper and lower handles 116, 122 apart, thereby moving the pivot 128 past the centerline A between the pivots 114, 120 to the position shown in FIG. 8. In squeezing the lever 134 against either of the handles 116, 122, the thickened portion 136 is urged against either the upper or lower camming surface 138, 140.

When the blade bar 66 and anvil bar 88 are urged together in the manner previously described, the blade bar may rotate about pivot 79 so that the blade 62 may contact the anvil 64 evenly and with uniform pressure along its length. The blade 62 and anvil 64 make a fusion-like incision through overlapping layers of a plastic web; that is, the edges of the overlapping layers of webs defining the incision are lightly bonded together. The cutter 60 is also adjustable in that the screw 80 and lock nuts 86 may be repositioned relative to each other to vary the pressure exerted by the blade 62 on the anvil 64 when the cutter is locked into a clamped position.

Microbicidal Tape

As shown in FIGS. 3 and 7, the apparatus of the invention also includes a pressure-sensitive tape having biocidal or microbicidal qualities. In FIG. 3, a strip of double-sided tape 214 is shown. In FIG. 7, upper and lower strips of single-sided tape 216, 218, respectively, are shown. In the preferred embodiment, the tape 214, 216, 218 comprises a carrier film of polypropylene coated with a pressure-sensitive adhesive such as an acrylic resin copolymer emulsion, which is inherently tacky, mixed with a microbicidal agent such as Proxel GXL ("Proxel" is a registered trademark of Imperial Chemical Industries, Ltd., London, England). Proxel GXL is an aqueous solution of 1,2 benzisothiazolin-3-one. A well-known acrylic resin copolymer emulsion is the National Starch 33-4507 adhesive, manufactured by National Starch and Chemical Corp., Bridgewater, N.J. It is understood that other types of carrier film may be utilized, such as biaxially oriented polyethelene terephthalate or polyvinyl chloride, or nonwoven fiber.

The microbicidal tape may be manufactured by well-known methods. For example, the aforementioned microbicidal agent may be mixed in a vessel with the adhesive in the ratio of 26 grams of germicide to 100 pounds of adhesive, a concentration of 0.057 percent by weight. Concentrations of between 0.02 to 0.09 percent are acceptable. When the mixture becomes homogeneous, the mixture is applied to the surface of a strip of silicone-coated, super calendered bleached kraft paper, used as a release paper.

The release paper, coated on one side with the mixture, is worked to evaporate the water, then a polypropylene carrier film is laminated to the microbicidal adhesive coating. The resulting lamination is rolled into a coil. In the case of the double-sided tape 214, a strip of release paper is used in which both sides are coated with silicone. After one side is laminated with the microbicidal adhesive mixture and carrier film as before, the other side is coated with microbicidal adhesive mixture, worked, and the resulting lamination of strips and adhesive mixture is wound into a coil. By coiling the lamination, the exposed side of the carrier film is brought into contact with the exposed adhesive on the opposite side of the release paper, thus giving the film a second adhesive coating mixture.

In the preferred embodiment, the polypropylene carrier film has a thickness of approximately one-half mil (0.0005 inches) and the microbicidal adhesive coating has a thickness of approximately 1 mil (0.001 inches). When the tape is used, it is merely unrolled from the coil, cut to the appropriate length, then separated from the release paper. In the case of the double-sided tape 214, the tape may be uncoiled and cut from the coil, applied to the desired surface, then the release paper may be removed to expose the second adhesive coated side.

Method

Figure 16:
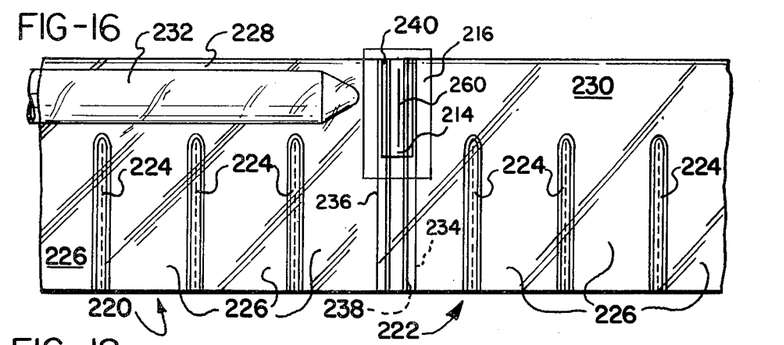
FIG. 16 is a somewhat schematic view of a filling pipe inserted into a longitudinal channel in a web of pouches and approaching the finished joint of the invention.

The method of the invention is used to join together webs of pouches or bags of the type shown most clearly in FIG. 16. In FIG. 16, webs 220, 222 are made of a tubular web of a heat-sealable polyolefin such as polyethylene or polypropylene. The webs 220, 222 include a series of transverse heat seals 224 which extend partially across the width of the webs to form pouches 226. The pouches 226 of webs 220, 222 communicate with each other in the same web by longitudinal channels 228, 230, respectively. As shown in FIG. 16, the channels 228, 230 are sized to permit a feeding tube 232 to be extended along their lengths to deposit material into the pouches 226. The ends 234, 236 of the webs 220, 222, respectively, are sealed by transverse end seals 238, 240 which extend completely across the web to seal the interior from the atmosphere.

As shown in FIG. 1, the bag supporting assembly 10 is positioned between boxes 242, 244 of fan folded webs 220, 222, respectively. The boxes 242, 244 preferably are spaced closely to each other to permit the bag supporting assembly 10 to be supported by inserting the downturned edge 32 of the assembly into the box 242, and resting the flange 28 upon the upper edge 246 of the box 244. The tool support 14 is inserted into the trough portion 15 of the splicing frame 12 such that its base 50 is substantially coplanar with the flanges 28, 30 to provide a substantially level working surface. The tool support 14 is slid into the trough portion 15 until it abuts the stop 26, thus assuring proper positioning of the support.

As shown in FIG. 3, the leading end 234 of the fan folded web 220 is removed from the box 242 and is placed upon the web supporting assembly 10 so that the transverse end seal 238 lies past the center of the tool support 14 by at most one-eighth inch. At this time, the clamping jaw 36 is rotated downwardly so that the insert 44 presses against the web 220 to hold the end 234 in place against flange 30. A length of double-sided microbicidal tape 214 is applied to the upper wall 248 of the web 220 and is centered on the tool support 14 at the location where the peel seal and cutting will be made.

Figure 12:
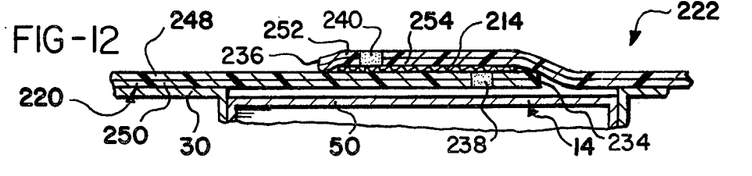
FIG. 12 is a cross-sectional view of the overlapping area formed by the ends of the webs taken at line 12—12 in FIG. 5.

As shown in FIGS. 3 and 5, the trailing end 236 of the web 222 is then removed from the box 244 and placed over the leading end 234 of the web 220 so that the end seal 240 lies past the center of the support 14 approximately one-eighth inch. The clamping jaw 34 is rotated downwardly to prevent movement of the trailing end 236. The ends 234, 236 of the webs 220, 222 now form an overlapping area shown in FIG. 12 which is centered on the tool support 14 and in which the distance between end seals 238, 240 is approximately one-quarter inch. As shown in FIG. 12, the upper and lower walls 248, 250 of the web 220 are compressed together and the lower wall 250 is superposed to the base 50 of the tool support 14 and the flange 30. The upper and lower walls 252, 254 of the web 222 are also compressed together such that the lower wall adheres to the tape 214 which, in turn, adheres to the upper wall 248 of the web 220. The tape 214 extends across the overlapping area bounded by the end seals 238, 240.

Figure 13:
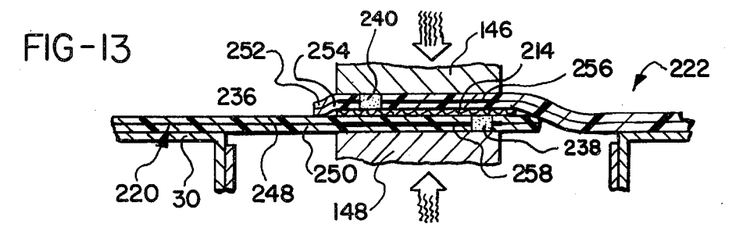
FIG. 13 is a cross-sectional view, in section, of the peel sealing process sealing the inner walls of the ends of the webs together and taken at line 13—13 of FIG. 6.

As shown in FIGS. 5, 6, and 13, the tool support 14 is then removed from the splicing frame 12 and inverted so that the cross member 52 is substantially coplanar with the flanges 28, 30. The peel seal tool 144 is inserted between the side walls 46, 48 of the support 14 so that the grooves 165 (shown in FIGS. 10 and 11) slidably engage rails 56, 58 and the upper and lower heating pads 146, 148 are positioned immediately above and below the upper wall 252 of web 222 and lower wall 250 of web 220 in the overlapping area bounded by end seals 238, 240. The peel seal tool 144 is inserted into tool support 14 until the lower jaw 166 contacts the stop 54 (FIG. 4). The pads 146, 148 are thus properly positioned and widthwise across the webs 220, 222.

The handles 176, 182 are squeezed together to bring the heating pads 146, 148, having been heated to a peel sealing temperature appropriate for the material of the webs 220, 222, into contact with the webs in the overlapping area as shown in FIG. 13. The handles 176, 182 are brought together to a locking position, as previously described.

The application of heat and pressure by the peel seal tool 144 creates sealed areas 256, 258 between the upper and lower walls 252, 254 and 248, 250 of webs 222, 220. The peel sealed areas 256, 258 are positioned directly above and below the tape 214 between the webs 220, 222 in the overlapping area.

Figure 14:
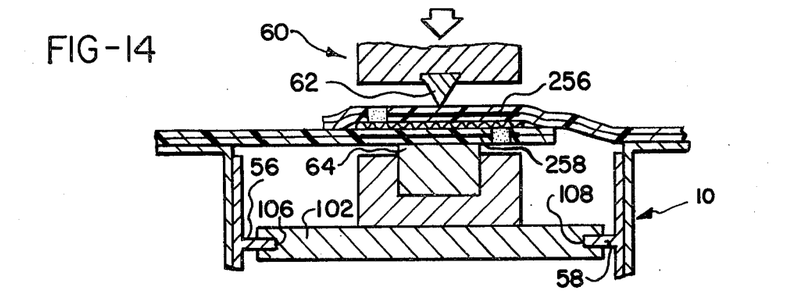
FIG. 14 is a cross-sectional view of the overlapping area of the webs about to be cut by the cutter, the cutter being shown schematically and in section.
Figure 15:
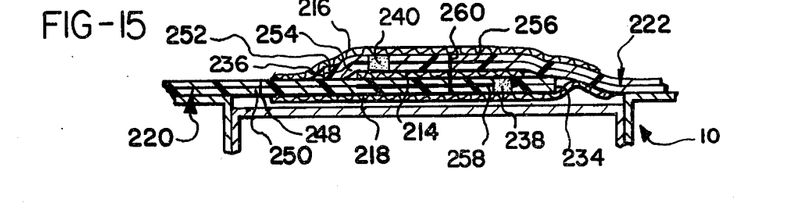
FIG. 15 is a cross-sectional view in section of the completed joint.

As shown in FIGS. 7, 14, and 15, the peel seal tool is then removed from the web supporting assembly 10 and the cutter 60 is inserted into the tool support 14 so that the grooves 106, 108 of the flange 102 slidably engage the rails 56, 58 of the tool support. The cutter 60 is inserted into the support 14 until the flange 102 contacts the stop 54 (FIG. 4). Thus, the cutter 60 is properly positioned widthwise across the webs 220, 222. The blade 62 is located at the center of the tool support 14. The cutter 60 is now in the open position, as shown in FIG. 14 so that the blade 62 and anvil 64 are approximately centered above and below the portion of the overlapping area having the peel seals 256, 258.

The handles 116, 122 are squeezed together until the cutter 60 is in a locking position, as previously described, thereby bringing the blade 62 and anvil 64 together to make an fusion-like incision 260 through the walls 248, 250, 252, 254 of the webs 220, 222, as well as through the tape 214 (shown in FIG. 15). The incision 260 extends from a point away from the longitudinal edges of the webs 220, 222 across the width of the webs and has a length less than that of the peel seals 256, 258 and double sided tape 214, so that the incision is bounded on all sides by the peel seals and tape. Since end seal 238 is slightly closer to the center of the support 14 (where the incision 260 is made), the incision will pass through the overlapping area at a point closer to end seal 238 than end seal 240.

The cutter 60 is then unlocked in the manner previously described and removed from the tool support 14. The support 14 is then inverted to bring base 50 adjacent the flanges 28, 30. Single-sided microbicidal strips of tape 216, 218 are applied to the upper wall 252 and lower wall 250 of the webs 222, 220, respectively. In the preferred method, the tape 218 is placed on the base 50 and retained there by means such as double-sided adhesive tape (not shown). The support 14 is inserted into the trough portion 15 to abut the stop 26 and the overlapping webs 220, 222 are pressed downwardly upon the tacky side of the tape 18. Since the base 50 is lower than the flanges 28, 30, the tape 218 does not catch on the webs 220, 222 during insertion.

In the preferred method, a liquid microbicidal agent, such as hydrogen peroxide, is first applied to the incision 260 by means such as a cotton swab to sterilize the area of the incision. As shown in FIG. 15, the strips of tape 216, 218 are preferably about two inches wide and about four inches long. They are sufficiently wide to cover not only the overlapping area, but the ends 234, 236 of the webs 220, 222, and an adjacent portion of the underlying wall of the opposite web. Thus, strip 218 covers end 234 and attaches to lower wall 254 of web 222, and strip 216 covers end 236 and attaches to upper wall 248 of web 220, so that the end of one web is held down against the adjacent wall of the other to prevent the ends from catching on equipment or the like during the filling of the pouches and tearing the joint apart. The strips 216 and 218 are sufficiently long to cover the incision 260 completely. The aseptic joint between web 220 and web 222 has now been completed.

Asepsis of the interiors of the webs 220, 222 is maintained throughout the joining process. At the time the fusion-like incision 260 is made by the cutter 60, the walls of the webs 248, 250, 252, 254 are joined together by peel seals 256, 258 thereby preventing the interiors of the webs from communicating with the atmosphere. By utilizing microbicidal tape such as the tapes 214, 216, 218, the external surfaces of the webs adjacent the incision 260 are maintained in a sterilized condition and are sealed from the atmosphere.

Figure 17:
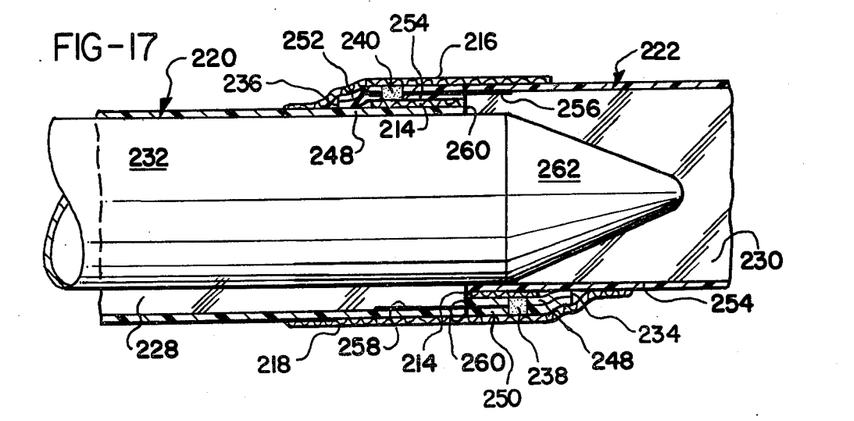
FIG. 17 is a side view in section of the walls of the webs adjacent the finished joint of the invention separated by the tip of the filling pipe and taken at lines 17—17 of FIG. 18.
Figure 18:
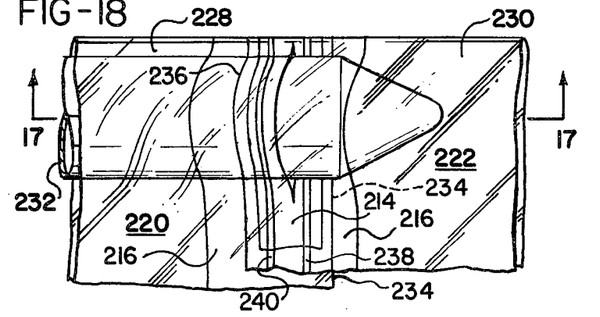
FIG. 18 is a detail of the filling pipe of FIG. 16 passing through the finished joint of the invention.

As shown in FIGS. 16, 17, and 18, the webs 220, 222 are separated adjacent the joint by the displacement of the feed tube 232 relative to the webs. It is to be understood that the tube 232 could also be held stationary and the webs 220, 222 slid onto it. As the feed tube 232 is displaced along the longitudinal channel 228 of the web 220, and encounters the overlapping area of the two bags, it separates the peel seal 258 of that web before or downstream of the fusion-like incision 260. As it is displaced further it passes through the incision 260 and enters the web 222 to separate the peel seal 256 of the web 222 after or upstream of the incision and enter the longitudinal channel 230.

As best shown in FIG. 17, it is desirable to form the joint such that the incision 260 is closely adjacent the transverse end seal 238 of the web 220 to reduce the danger that nose 262 would become caught in a pocket formed by excessive film between incision 260 and end seal 238 during displacement of the feed tube and rupture the joint. In the separated position, walls 248, 250 downstream of the incision 260 are held together by a portion of the peel seal 258. Similarly, walls 252, 254 of web 222 are held together by a portion of peel seal 256 before or downstream of the incision 260. The upper wall 248 of the web 220 is held to the lower wall 254 of the web 222 upstream of the incision 260 by a section of double-sided tape 214 upstream of the incision and by tape 216. Similarly, the lower wall 254 of the web 222 is held to the upper wall 248 of the web 220 downstream of the incision 260 by a portion of the tape 214 downstream of the incision and by tape 216. Thus, the various walls of the overlapping webs 220, 222 are held together and sealed from microbes in the ambient air.

The splicing frame and tool support preferably are made of metal, such as stainless steel, desirable for its anticorrosive properties. The load-bearing portions of the cutter and peel seal tool are preferably made of metal such as steel.

While the form of the method and apparatus herein described constitute preferred embodiments of this invention, it is to be understood that the invention is not limited to these precise forms of methods and apparatus, and that changes may be made therein without departing from the scope of the invention.

What is claimed is:

1. A method of joining together two tubular webs, each collapsed to form opposing walls, and having a sealed leading end and a sealed trailing end, comprising the steps of:
   placing said leading end of one of said webs over said trailing end of the other of said webs to form overlapping ends;
   applying microbicidal adhesive means between said overlapping ends, thereby joining said overlapping ends together;

forming a peel seal between said opposing walls of each of said overlapping ends above and below said adhesive means;

making a fusion-like incision through said overlapping ends within said peel seals and through said adhesive means;

sealing said incision with second microbiocidal adhesive means; and separating portions of said peel seals of each of said webs at said incision to provide an internal passageway through the joined tubular webs.

2. A method of joining two tubular, internally aseptic webs of the type wherein a tube-shaped web of a heat-sealable polyolefin is collapsed to form opposing walls, said webs having a sealed leading end and a sealed trailing end, comprising the steps of:

bringing said leading end of a first one of said webs into overlapping relationship with said trailing end of a second one of said webs, thereby forming an overlapping area extending transversely of said webs and extending between said end seals, said area comprising four layers of said opposing walls of said webs;

applying microbicidal adhesive means between said overlapping ends of said first and said second webs, thereby holding said ends in said overlapping relationship;

forming a peel seal between said opposing walls of each of said webs in said overlapping area above and below said microbicidal adhesive means;

making a transverse fusion-like incision within said peel seals in said overlapping area and through said webs and said adhesive means;

applying second microbicidal adhesive means to said webs in said overlapping area, thereby covering and sealing said incision; and separating said walls of said first web to said incision, and separating said walls of said second web to said incision, thereby forming a continuous passageway between said webs and through said incision.

3. The method of claim 2 wherein said step of applying said second adhesive means includes an initial step of applying microbicidal means to said incision.

4. The method of claim 2 wherein said step of applying said microbicidal adhesive means comprises applying a strip of double-sided microbicidal tape to overlapping ones of said walls of said webs.

5. The method of claim 4 wherein said adhesive means and said second adhesive means comprises a mixture of a pressure-sensitive adhesive and a microbicide comprising an aqueous solution of 1,2 benzisothiazolin-3-one in a concentration of 0.02 to 0.09 percent.

6. The method of claim 5 wherein the concentration of said microbicide is 0.057 percent.

7. The method of claim 2 wherein said step of making an incision includes making said incision closer to a predetermined one of said end seals defining said overlapping area.

8. The method of claim 2 wherein said step of applying second microbicidal adhesive means includes the step of applying second microbicidal adhesive means such that said leading end of said first web is held to said second web, and said trailing end of said second web is bound to said first web.

* * * * *